United States Patent [19]
Naldi

[11] Patent Number: 5,850,774
[45] Date of Patent: Dec. 22, 1998

[54] PANEL CUTTING MACHINE

[75] Inventor: Valter Naldi, Bologna, Italy

[73] Assignee: SELCO S.r.l., Italy

[21] Appl. No.: 668,319

[22] Filed: Jun. 26, 1996

Related U.S. Application Data

[63] Continuation of Ser. No. 243,866, May 17, 1994, abandoned.

[30] Foreign Application Priority Data

May 17, 1993 [IT] Italy ................................ B093A0214

[51] Int. Cl.⁶ ........................................................ B26D 7/06
[52] U.S. Cl. .............................. 83/418; 83/412; 83/404.2; 83/733
[58] Field of Search .............................. 83/418, 422, 419, 83/404.2, 35, 36, 29, 733, 412

[56] References Cited

U.S. PATENT DOCUMENTS

| | | | |
|---|---|---|---|
| 560,064 | 5/1896 | Hodgson | 83/419 |
| 569,200 | 10/1896 | Hobbs | 83/419 |
| 3,529,331 | 9/1970 | Putin | 83/418 |
| 3,570,344 | 3/1971 | Bryson et al. | 83/422 |
| 3,688,619 | 9/1972 | Yabuta | 83/419 |
| 3,818,790 | 6/1974 | Culp et al. | 83/408 |
| 3,908,980 | 9/1975 | Fowler | 83/419 |
| 4,397,205 | 8/1983 | Kirstein | 83/419 |
| 5,002,108 | 3/1991 | Jenkner | 83/419 |
| 5,127,294 | 7/1992 | Mohr | 83/419 |
| 5,176,056 | 1/1993 | Tagliaferri | 83/404.2 |
| 5,375,492 | 12/1994 | Smitterberg et al. | 83/419 |

FOREIGN PATENT DOCUMENTS

| | | |
|---|---|---|
| 0070399 | 1/1983 | European Pat. Off. . |
| 3118379 | 11/1982 | Germany . |
| 8706809 | 8/1987 | Germany . |
| 3907566 | 8/1990 | Germany . |

*Primary Examiner*—Kenneth E. Peterson
*Assistant Examiner*—Sean Pryor
*Attorney, Agent, or Firm*—Geoffrey R. Myers

[57] ABSTRACT

A machine including a loading station for loading a pack of panels; a cutting station in which a cutting line is defined; a fixed structure located between the loading and cutting stations presenting a work surface; and a device for 90° rotation of the pack of panels loaded onto the work surface. The 90° rotation device includes: a frame for supporting the pack; a mechanism for moving the frame from a level below to a level above the work surface and vice versa; and a mechanism for rotating the frame 90° clockwise and vice versa. The work surface presents first and second openings with longitudinal axes respectively parallel and perpendicular to the cutting line, for enabling movement of the frame from a level below to a level above the work surface and vice versa.

12 Claims, 2 Drawing Sheets

PANEL CUTTING MACHINE

This is a continuation of application Ser. No. 08/243,866, filed on May 17, 1994, now abandoned.

BACKGROUND OF THE INVENTION

The present invention relates to a panel cutting machine.

Known panel cutting machines substantially comprise a loading station, at least one cutting station, and a fixed work surface along which packs of panels are transferred from the loading to the cutting station. Some machines, particularly those for cutting large-size panels, feature a system whereby the pack for supply to the cutting station is rotated 90°, to enable the pack to be fed to the cutting station with its longer or shorter side parallel to the cutting line.

A first currently marketed solution provides for translating and rotating the pack by means of a rotary arm with air-powered grippers by which the pack is engaged. Such a solution presents substantially two drawbacks consisting in the large size of the work surface, and chafing between the work surface and the pack. The length of the work surface in fact must be at least equal to the sum of the longer and shorter sides of the pack, while chafing increases the force demanded of the grippers and the rotary arm for respectively keeping the individual panels in the pack aligned, and for rotating the pack.

A second currently marketed solution provides, with the aid of a contrast roller projecting from the work surface, for rotating the pack by means of an air-powered gripper which engages one corner of the pack and travels in a direction perpendicular to the cutting line. The main drawback of this solution is the chafing between the pack and the work surface, which results in misalignment of the individual panels in the pack even when considerable force is exerted by the grippers.

A third solution features a pack lifting device with suction cup type gripping means for engaging the pack, and housed inside a compartment in a central portion of the work surface. In actual use, the device first moves upwards to raise the pack off the work surface, rotates 90° about a vertical axis, and then returns inside the compartment, depositing the pack on the work surface. The main drawback of this solution consists in the pack being positioned at all times in the central portion of the work surface and, hence, being cut along the central portion of the cutting line, thus increasing the amount of travel required of the cutting blade. The central position of the pack also increases the travel of follow-up tools and members after the first cut, thus resulting in an excessively long machine cycle which is inevitably reflected in production cost.

A fourth solution, as opposed to a fixed work surface, features a movable work surface with means for moving it back and forth between the loading and cutting stations, and means for rotating it about a vertical axis. Substantially, the work surface travels from the cutting station to the loading station to pick up the pack, moves back a given distance towards the cutting station, rotates about the vertical axis, and then continues towards the cutting station. One of the main drawbacks of this solution is the highly complex design of the work surface. What is more, unlike the solutions described above, the work surface is employed for transferring the pack to the cutting station even when rotation of the pack is not required. Finally, notwithstanding the smooth finish of the work surface for enabling two-way slide of the pack, considerable friction occurs between the work surface and contacting surface of the pack, so that this solution, too, results in chafing of the pack on the work surface.

An important point to remember in connection with chafing is that, in addition to misaligning the pack, it also results in surface scratching and hence rejection of the bottom panel contacting the work surface, thus increasing cost, especially in the case of panels with fine quality wood facing. The only way of safeguarding to some extent against damage caused by chafing is to reduce the output rate, which again results in higher production cost.

SUMMARY OF THE INVENTION

It is an object of the present invention to provide a panel cutting machine designed to overcome the aforementioned drawbacks, i.e. featuring a pack rotation system involving no chafing of the pack, and which is of straightforward design.

Further objects and advantages of the present invention will be disclosed in the following description.

According to the present invention, there is provided a cutting machine comprising:

a loading station for loading a pack of rectangular panels;

a cutting station;

a fixed structure between said loading station and said cutting station, and presenting a horizontal work surface with a first lateral edge perpendicular to a cutting line defined in said cutting station; and a device for rotating by 90°, at said work surface, said pack of panels loaded onto said work surface at said loading station;

characterized in that said device comprises a horizontal frame for supporting said pack; first means for moving said frame from a level below to a level above said work surface and vice versa; and second means for rotating said frame 90° clockwise and vice versa, when said frame is above said work surface; and characterized in that said work surface presents a first opening with a longitudinal axis parallel to said cutting line, for enabling said frame to move freely from a level below to a level above said work surface and vice versa; and a second opening with a longitudinal axis perpendicular to said cutting line, for enabling said frame to move freely from a level below to a level above said work surface and vice versa.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
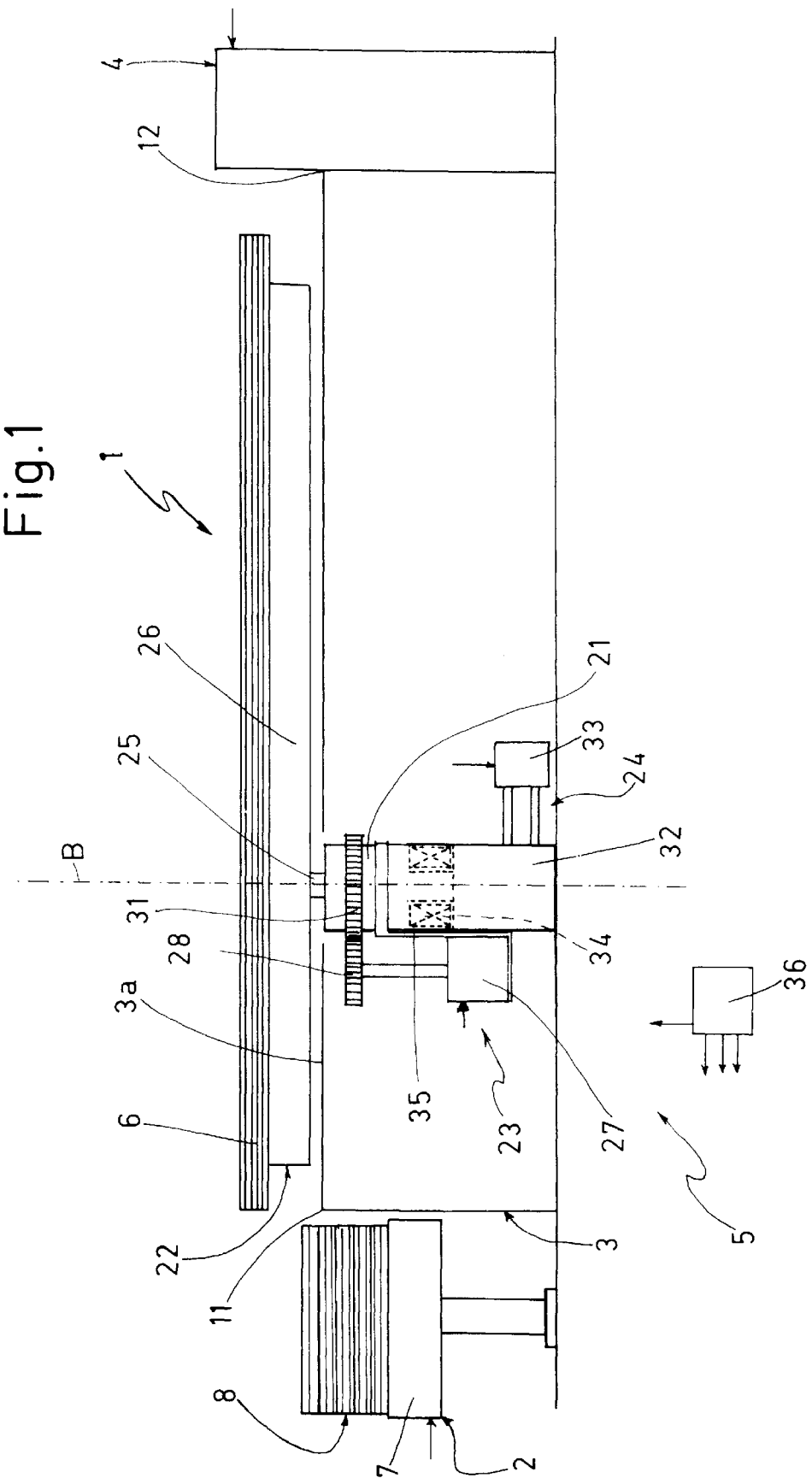
FIG. 1 shows a schematic side view of a cutting machine in accordance with the teachings of the present invention.

Number 1 in FIG. 1 indicates a cutting machine comprising:

a fixed structure 3, the top surface of which defines a horizontal work surface 3a;

a device 5 for rotating by 90°, at work surface 3a, a pack 6 of rectangular panels loaded onto surface 3a at loading station 2.

With reference to FIG. 1, loading station 2 comprises a platform 7 supporting a stack 8 of panels from which, by means of push means not shown, a pack 6 is removed and loaded onto work surface 3a. Platform 7 presents means for moving stack 8 up and down.

Figure 2:
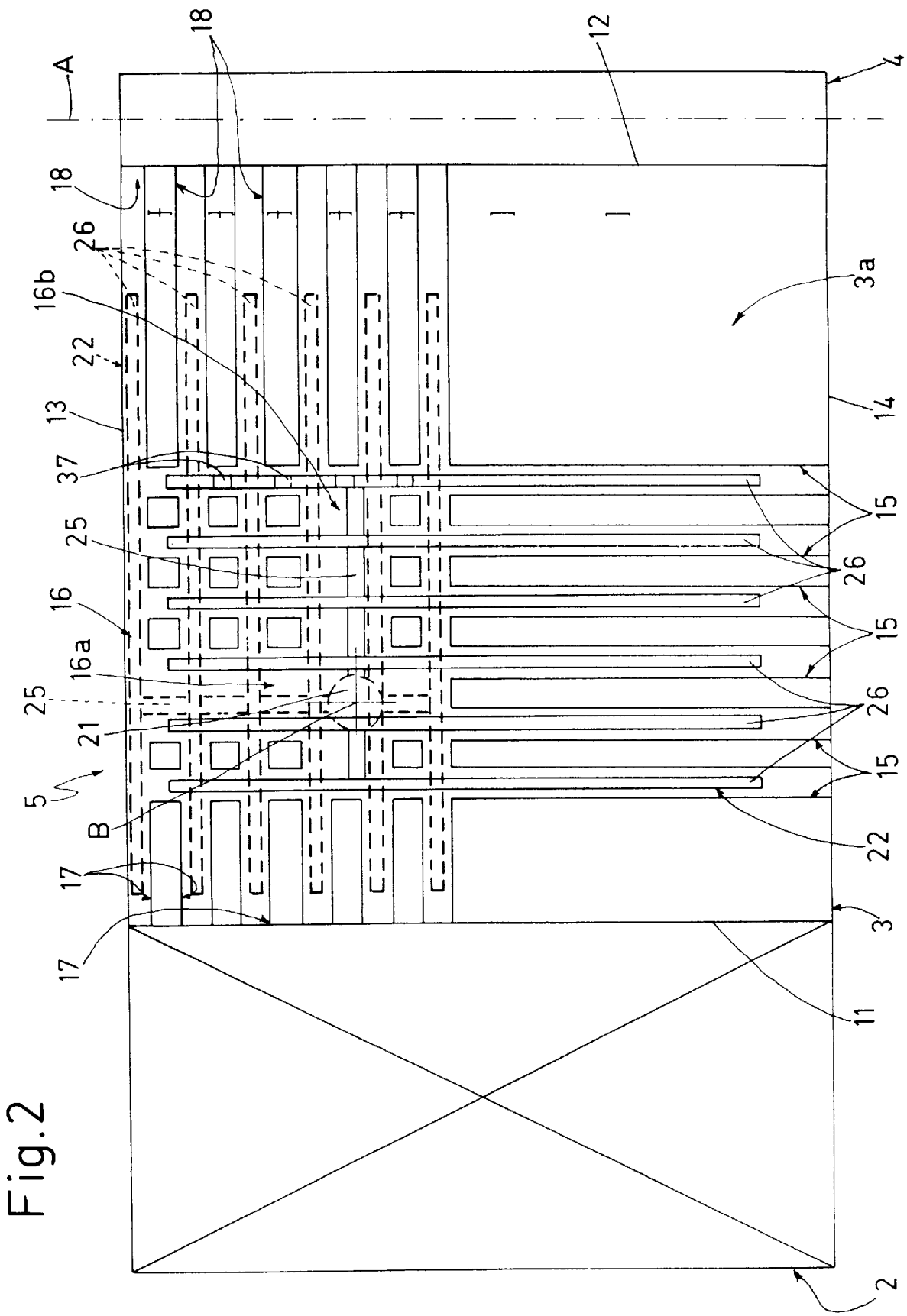
FIG. 2 shows a plan view of the FIG. 1 machine.

With reference to FIG. 2, when viewed from above, work surface 3a is rectangular, with two edges 11 and 12 parallel to each other and to a cutting line A defined in cutting station 4, and two edges 13 and 14 parallel to each other and perpendicular to edges 11 and 12. Edges 13 and 14 are longer than edges 11 and 12, and edge 13 constitutes a reference point (known as 0 point) for both loading and cutting. Pack 6, in fact, when being loaded, before and after being rotated 90°, when being transferred to cutting station 4, and when being cut, always presents one (long or short) side in line with edge 13.

Close to loading station 2, work surface 3a presents a number of through slots 15 with longitudinal axes parallel to one another and to cutting line A, and defined between edge 14 and the central portion of surface 3a. From slots 15 to edge 13, work surface 3a presents a checkerboard portion 16 with a number of gaps in line with and continuing from slots 15 up to edge 13. Said gaps present the same width as slots 15, with the exception of one, indicated 16a, which presents a width equal to the total width of two adjacent slots 15 and the solid portion defined between them.

Close to edge 13, work surface 3a presents a number of through slots 17 originating from edge 11, having longitudinal axes parallel to one another and perpendicular to cutting line A, and defined between edge 11 and portion 16. Finally, close to edge 13, work surface 3a presents a number of through slots 18 originating from edge 12, in line with and of the same width and number as slots 17, and defined between edge 12 and portion 16.

Portion 16 presents a number of gaps in line with and continuing from slots 17, 18, and of the same width as slots 17, 18 with the exception of one, indicated 16b, which presents a width equal to the total width of two adjacent slots 17 and the solid portion defined between them. The axes of gaps 16a, 16b intersect perpendicularly; and the total length of slots 15 and the respective in-line gaps in portion 16 is less than the total length of slots 17, 18 and the respective in-line gaps in portion 16. The solid portions of work surface 3a are fitted with known rollers (not shown), the longitudinal axes of which are parallel to cutting line A.

With reference to FIGS. 1 and 2, device 5 comprises a column 21 rotating about a vertical axis B at which the axes of gaps 16a, 16b intersect, and which is eccentric in relation to a vertical axis through the geometric center of work surface 3a. Device 5 also comprises a frame 22 supported by column 21; means 23 for rotating column 21 and hence frame 22 about axis B; and means 24 for moving column 21 and hence frame 22 up and down along axis B. Means 23 and 24 are housed inside structure 3. Frame 22 is horizontal, and comprises a member 25 fitted to column 21; and a number of members 26 fitted to and above member 25, having respective longitudinal axes parallel to one another and perpendicular to the longitudinal axis of member 25, and the length of which is just short of the total length of slots 15 and the respective in-line gaps in portion 16.

With reference to FIG. 1, in the non-limiting embodiment shown, means 23 comprise an electric motor 27, the output shaft of which is fitted with a gear 28 meshing with a gear 31 formed on column 21; and, again in the non-limiting embodiment shown, means 24 comprise a hydraulic actuator 32 beneath and coaxial with column 21, and supplied by a hydraulic system 33 (shown schematically) for moving column 21 along axis B. A thrust bearing 34 between the bottom portion of column 21 and the rod of actuator 32 permits rotation of column 21; and a bracket 35, connected in axially-fixed and angularly-free manner to column 21, supports motor 27 to enable it to accompany the linear movement of column 21. Loading station 2, cutting station 4 and device 5 (in particular, means 23 and 24) are controlled by an electronic control system 36.

With reference to FIG. 2, in actual use, when loading pack 6 onto work surface 3a, frame 22 (as illustrated by the continuous line) is positioned beneath work surface 3a, with members 26 parallel to cutting line A and just beneath slots 15 and the respective in-line gaps in portion 16, and with member 25 just beneath gap 16b in portion 16. Pack 6 is pushed onto work surface 3a until the longer side of the pack corresponds with member 26 closest to cutting line A, during which loading stage, the shorter side of pack 6 is aligned with edge 13 constituting the 0 reference point for the cutting stage.

At this point, means 24 moves frame 22 upwards parallel to itself and beyond work surface 3a, so as to detach pack 6 from surface 3a; and means 23 rotates column 21, and hence frame 22, 90° anticlockwise (in FIG. 2) so that frame 22 is now positioned (as shown by the dotted line in FIG. 2 and the continuous line in FIG. 1) with members 26 parallel to edge 13 and just over slots 17, 18 and the respective in-line gaps in portion 16; with member 25 just over gap 16a in portion 16; and with the longer side of pack 6, which in the first position of frame 22 corresponded with member 26 closest to cutting line A, now in line with edge 13. This is made possible by the distance between rotation axis B and edge 13 being made equal to the distance between rotation axis B and the outermost side of member 26 closest to cutting line A in the first position of frame 22.

As pack 6 is raised, and more specifically on frame 22 first coming into contact with the pack, a number of known gripping means 37, fitted to the aforementioned member 26, grip pack 6 to prevent misalignment of the individual panels as it is raised.

Following rotation of frame 22 and hence pack 6 by means 23, means 24 moves frame 22 down, beneath working surface 3a, through slots 17, 18 and the respective in-line gaps in portion 16, during which downward movement, gripping means 37 release pack 6 which is deposited onto surface 3a. The push means (not shown) at loading station 2, or further push means, feed pack 6 towards cutting station 4; and, after pack 6 is cut, the above operation of frame 22 is repeated in reverse, in preparation for the next operating cycle, should machine 1 require 90° rotation of pack 6.

The advantages of the present invention are as follows.

In particular, it provides for a machine enabling 90° rotation of the pack with no chafing and hence no surface scratching of the panels. Moreover, during the loading stage, during transfer to the cutting station, and during the cutting stage, one side of the pack on the work surface is always aligned with the 0 reference point regardless of the angular position of the pack in relation to the rotation axis of the supporting frame, thus reducing the travel of the cutting blade on the machine. The lateral position of the pack in relation to the work surface also provides for reducing the travel of the follow-up tools and members after the first cut. As such, the present invention provides for reducing the operating time of the machine, and so reducing overall production cost. Finally, a further point to note is the straightforward design of the device by which the pack is rotated.

Clearly, changes may be made to machine 1 as described and illustrated herein without, however, departing from the scope of the present invention.

I claim:

1. A cutting machine comprising:

a loading station (2) for loading a pack (6) of rectangular panels;

a cutting station (4);

a fixed structure (3) between said loading station (2) and said cutting station (4) including a horizontal work surface (3a) with a first lateral edge (13) perpendicular to a cutting line (A) defined in said cutting station (4);

a device (5) for rotating by 90°, at said work surface (3a), said pack (6) of panels loaded onto said work surface (3a) at said loading station (2);

wherein said device (5) comprises:

a horizontal frame (22) for supporting said pack (6);

first means (24) for moving said frame (22) from a level below to a level above said work surface (3a) and vice versa; and second means (23) for rotating said frame (22) 90° clockwise and vice versa about an unmoving rotation axis (B) perpendicular to the work surface (3a), when said frame (22) is above said work surface (3a);

wherein said work surface (3a) defines a first opening with a longitudinal axis parallel to said cutting line (A), for enabling said frame (22) to move freely from a level below to a level above said work surface (3a) and vice versa; and a second opening with a longitudinal axis perpendicular to said cutting line (A), for enabling said frame (22) to move freely from a level below to a level above said work surface (3a) and vice versa;

said elements cooperating in such a manner that a first side of said pack (6) is aligned with said first lateral edge (13) and a second side of said pack is aligned with a side of said frame (22) parallel to and closest to said cutting line (A); and wherein the distance between said rotation axis (B) and said first lateral edge (13) equals the distance between said rotation axis (B) and said side of said frame (22) parallel to and closest to said cutting line (A) when said frame (22) is aligned with said first opening.

2. A machine as claimed in claim 1, wherein said frame (22) includes means for clamping said pack (6) to said frame (22) during said 90° rotation.

3. A machine as claimed in claim 1, wherein said work surface (3a) includes a plurality of first through slots (15) with longitudinal axes parallel to one another and to said cutting line (A); a checkerboard portion (16) defined by said first slots (15) and a plurality of first gaps in line with and continuing from said first slots (15); and said first slots (15) being defined from a second edge (14) of said work surface (3a) to said checkerboard portion (16).

4. A machine as claimed in claim 3, wherein said first gaps in said checkerboard portion (16) define the same width as said first slots (15), with the exception of one (16a) of said first gaps, which defines a width equal to the total width of two adjacent first slots (15) and the solid portion defined between said adjacent first slots (15).

5. A machine as claimed in claim 3, wherein said work surface (3a) defines:

a plurality of second through slots (17) parallel to said first edge and originating from a third edge (11) of said work surface (3a) close to said loading station (2);

a plurality of second gaps in said checkerboard portion (16), in line with and continuing from said second slots (17); and a plurality of third through slots (18) in line with and continuing from said second gaps, and defined up to a fourth lateral edge (12) of said work surface (3a) close to said cutting line (A).

6. A machine as claimed in claim 5, wherein said second gaps in said checkerboard portion (16) are of the same width as said second and third slots (17 and 18), with the exception of one (16b) of said second gaps, which is of a width equal to the total width of two adjacent said second slots (17) and the solid portion defined between said adjacent second slots (17).

7. A machine as claimed in claim 6, wherein said wider first gap (16a) and said wider second gap (16b) define longitudinal axes intersecting perpendicularly at said rotation axis (B).

8. A machine as claimed in claim 1, wherein said device (5) further comprises a column (21) coaxial with said rotation axis (B), and which is moved axially by said first means (24) and rotated about said rotation axis (B) by said second means (23); said column (21) supporting said frame (22).

9. A machine as claimed in claim 8, wherein said frame (22) further comprises a first member (25) fitted to said column (21); and a plurality of second members (26) fitted to said first member (25) and having respective longitudinal axes parallel to one another and perpendicular to the longitudinal axis of said first member (25) when said frame (22) is aligned with said first opening, said second members (26) aligned with said first slots (15) and said first gaps in said portion (16), and said first member (25) aligned with said wider second gap (16b); and, when said frame (22) is aligned with said second opening, said second members (26) correspond with said second and third slots (17 and 18) and said second gaps in said checkerboard portion (16), and said first member (25) corresponds with said wider first gap (16a).

10. A machine as claimed in claim 4, wherein said work surface (3a) defines:

a plurality of second through slots (17) parallel to said first edge and originating from a third edge (11) of said work surface (3a) close to said loading station (2);

a plurality of second gaps in said checkerboard portion (16), in line with and continuing from said second slots (17); and a plurality of third through slots (18) in line with and continuing from said second gaps, and defined up to a fourth lateral edge (12) of said work surface (3a) close to said cutting line (A).

11. A machine as claimed in claim 10, wherein said second gaps in said checkerboard portion (16) are of the same width as said second and third slots (17 and 18), with the exception of one (16b) of said second gaps, which is of a width equal to the total width of two adjacent said second slots (17) and the solid portion defined between said adjacent second slots (17).

12. A machine as claimed in claim 11, wherein said wider first gap (16a) and said wider second gap (16b) define longitudinal axes intersecting perpendicularly at said rotation axis (B).

* * * * *